United States Patent
Zhu et al.

(10) Patent No.: US 8,270,043 B2
(45) Date of Patent: Sep. 18, 2012

(54) SHEET-FED SCANNING DEVICE WITH CLEANING MECHANISM

(75) Inventors: Ying-Qi Zhu, Suzhou (CN); Li Li, Suzhou (CN)

(73) Assignee: Qisda (Suzhou) Co., Ltd, Suzhou, Jiangsu Province (CN)

( * ) Notice: Subject to any disclaimer, the term of this patent is extended or adjusted under 35 U.S.C. 154(b) by 551 days.

(21) Appl. No.: 12/512,031

(22) Filed: Jul. 30, 2009

(65) Prior Publication Data
US 2010/0039681 A1    Feb. 18, 2010

(30) Foreign Application Priority Data
Aug. 15, 2008   (CN) .......................... 2008 1 0021165

(51) Int. Cl.
*H04N 1/04* (2006.01)
(52) U.S. Cl. ........ 358/474; 358/471; 358/498; 399/238; 359/216; 15/229.12
(58) Field of Classification Search .................. 358/474, 358/471, 473, 496, 498; 399/120, 238, 119, 399/358, 258; 359/216; 15/229.12
See application file for complete search history.

(56) References Cited

U.S. PATENT DOCUMENTS

| | | | |
|---|---|---|---|
| 4,479,136 A * | 10/1984 | Lewis et al. ...................... 347/33 |
| 4,499,627 A * | 2/1985 | Gruns .......................... 15/210.1 |
| 5,457,843 A * | 10/1995 | Gelardi et al. ............. 15/229.12 |
| 6,129,019 A * | 10/2000 | Tobol et al. .................... 101/424 |
| 7,528,855 B2 * | 5/2009 | Namba .......................... 347/241 |
| 7,769,316 B2 * | 8/2010 | Kimura .......................... 399/103 |
| 7,911,640 B2 * | 3/2011 | Nishikawa .................... 358/1.18 |
| 7,950,649 B2 * | 5/2011 | Katsura et al. ............. 271/10.03 |
| 8,011,655 B2 * | 9/2011 | Ohishi et al. .................. 271/259 |
| 8,086,138 B2 * | 12/2011 | Sato .............................. 399/119 |
| 8,103,187 B2 * | 1/2012 | Sato .............................. 399/120 |
| 2007/0024943 A1 * | 2/2007 | Namba .......................... 359/216 |
| 2011/0242618 A1 * | 10/2011 | Takeuchi et al. .............. 358/474 |

* cited by examiner

*Primary Examiner* — Negussie Worku

(57) ABSTRACT

A sheet-fed scanning device with cleaning mechanism is provided. The sheet-fed scanning device includes a housing, a scanning module for scanning a fed-in document, and a cleaning curtain whose one end is fixed on the sheet-fed scanning device. The cleaning curtain is disposed in a sheet-fed direction at the front end of the scanning module, and the edge of the other end of the cleaning curtain is elastically in contact with the fed-in document for cleaning a to-be-scanned surface of the fed-in document. The invention is simple in structure and effective in cleaning the fed-in document. The cleaning mechanism does not cost much, but avoids the scanning quality being affected due to the large friction of the cleaning element. The cleaning mechanism ensures long-term cleanness of the to-be-scanned surface of the fed-in document as well as the cleanness of the glass window of the scanning module and the scanning quality.

10 Claims, 5 Drawing Sheets

SHEET-FED SCANNING DEVICE WITH CLEANING MECHANISM

This application claims the benefit of Taiwan application Serial No. 200810021165.1, filed Aug. 15, 2008, the subject matter of which is incorporated herein by reference.

BACKGROUND OF THE INVENTION

1. Field of the Invention

The invention relates in general to a scanning device or auxiliary device of the scanning device, and more particularly to a sheet-fed scanning device with cleaning mechanism for cleaning the fed-in document in a sheet-fed scanning device.

2. Description of the Related Art

Scanner is a widely used electronic input device. Critical parts of a scanner include a scanning module and a mechanic transmission portion. A sheet-fed scanner whose mechanic transmission portion has simple structure embodies the design of a small-sized portable scanning input device. The sheet-fed scanner normally adopts a contact image sensor (CIS) being still with respect to the body of the scanner, and the fed-in document is scanned by way of being moved with respect to the scanner body. Such way of scanning is applicable to a small-sized portable scanner in scanning a small-sized document such as photo, receipt, business card and other types of cards.

FIG. 1 shows a cross-sectional structure of a generally known portable scanner 100 when scanning a fed-in document. The portable scanner performs scanning with a CIS scanning module 130 being still with respect to the scanner body 110. A fed-in document 160 is placed on a document supporter 170 of a fed-in document entrance 120. The fed-in document 160 is conveyed by a mechanic transmission portion in the direction of an arrow illustrated in FIG. 1. The CIS scanning module 130 fixed inside the scanner body 110 is located above the fed-in document 160. The fed-in document 160 is driven by a sheet-feeding roller 140 of a document conveying mechanism. During the process of scanning, the fed-in document 160 enters the scanner via the fed-in document entrance 120 and is outputted from the fed-in document exit 150. The CIS scanning module 130 obtains a scanned data of the fed-in document 160 through the glass window 131. The portable scanner 100 is used for scanning many different types of documents, which inevitably have dust, liquid or other adhesive substances attached thereon. Let the scanned document be exemplified by a photo. Due to the adhesion characteristics of the surface of the scanned photo, it is very likely that the dust or the adhesive substances are carried to the surface of the glass window 131 of the CIS scanning module together with the fed-in photo during the scanning process. The dust or the adhesive substances that are attached or adhered onto the glass window 131 are hard to be removed. The glass window is a critical element with which the scanner obtains a scanned image. If the dust or the adhesive substances are attached or adhered onto the glass window, the scanning module will be beclouded, and the part of the fed-in document corresponding to the beclouded part will not be precisely scanned or will be scanned as a peculiar strip. As the scanning module is fixed on the scanner body, the glass window is hard to be cleaned. Meanwhile, the dust or the adhesive substances are also very likely to be attached or adhered on the feeding roller that drives the fed-in document, and further affect the normal operation of the rollers.

In order to remove the dust or the attached substances from the fed-in document, to improve scanning quality and to maintain the cleanness of the scanning module and the glass window, according to modern technology, a cleaning member parallel to the fed-in document is installed on the document supporter for cleaning the dust or the attached substances by means of surface friction which occurs between the cleaning member and the fed-in document. However, the above mechanism design has many defects. Firstly, the cleaning member is disposed at one side of the to-be-scanned surface and is hard to be fixed. Secondly, if the surface friction occurring between the cleaning member and the fed-in document is larger, the fed-in document will encounter a large resistance when the fed-in document is being fed in, and the scanning speed of the scanning module will lose its stability. As a result, problems such as extension and distortion in the scanned image will occur. Also, if the frictional resistance is too large, the surface of a dedicate fed-in document such as photo may be scratched. To the worse, if the pulling force between the feeding roller and the cleaning member is too large, the fed-in document may even be damaged or torn apart. On the other hand, as the cleaning member must be fixed, the dust and impurities once being attached or adhered onto the cleaning end of the cleaning member are hard to be cleaned. The dust and impurities may even be consolidated as big pellets. If the pellets come off the cleaning end and are carried to the glass window of the scanning element together with the fed-in document, severe scanning defects would occur.

SUMMARY OF THE INVENTION

The invention is directed to a sheet-fed scanning device with cleaning mechanism for cleaning a to-be-scanned surface of the fed-in document. The sheet-fed scanning device with cleaning mechanism has reasonable design in the structure and is effective in cleaning the dust, which is carried by the fed-in document and affects the correct scanning of the glass window of the scanning module, to ensure long-term cleanness of the glass window of the scanning module and obtain a clear and correct scanned image.

The technology of the invention is disclosed below.

A sheet-fed scanning device with cleaning mechanism, including;

A housing;

A scanning module for scanning a fed-in document;

A cleaning curtain whose one end is fixed on the sheet-fed scanning device, wherein the cleaning curtain is disposed in a sheet-fed direction at the front end of the scanning module, and the edge of the other end of the cleaning curtain is elastically in contact with the fed-in document for cleaning a to-be-scanned surface of the fed-in document.

To put it in greater details, the cleaning curtain and the scanning module are located at the same side of the housing, the cleaning curtain is a flexible sheet, the upper end portion of the cleaning curtain is fixed on the inner wall of the housing, and the lower end portion of the cleaning curtain is located under the plane of the fed-in document, so that the lower end portion is bent and forms a linear contact with the fed-in document when the cleaning curtain is in contact with the fed-in document.

The cleaning curtain is perpendicular to the fed-in document or forms an obtuse angle with an out-going direction of the fed-in document.

The cleaning curtain is fixed at the inner side of the housing of the scanner document feeding entrance, wherein the width of the cleaning curtain is equal to or larger than that of the transparent window of the scanning module.

The cleaning curtain includes a flexible plastics sheet made from rubber or foam, wherein the upper end portion of the cleaning curtain and the inner wall of the housing are integrally formed in one piece.

The cleaning curtain is a dual-layered composite structure of a flexible sheet and a soft cleaning member.

The cleaning curtain includes a hard or a flexible sheet, wherein the hard sheet or the flexible sheet is located at the lower end of the cleaning curtain, the upper end of the hard or the flexible sheet has a connecting element elastically connecting the hard or the flexible sheet to the housing.

The sheet-fed scanning device includes a fed-in surface for carrying the fed-in document, wherein the height of the cleaning curtain is larger than the distance between the upper end portion of the cleaning curtain and the fed-in surface, so that after the lower end portion of the cleaning curtain is bent, the lower end portion is elastically in contact with the fed-in document.

The cleaning curtain is fixed on the inner wall of the housing or the scanner fixing component at the front end of the scanning module.

A fixing element is disposed on the upper end portion of the cleaning curtain, wherein the fixing element includes an embedding portion or an engaging portion for attaching to the inner wall of the housing.

The sheet-fed scanning device with cleaning mechanism has very small resistance during the cleaning process. The cleaning curtain, forming a linear contact or approximately linear contact with the to-be-scanned surface of the fed-in document, has excellent performance and small resistance during the cleaning process. The cleaning curtain can be disposed in a sheet-fed direction at the front end of the scanning module of the scanning device and can be fixed with the scanner body. The width of the cleaning curtain is equal to or slightly larger than the scan width, so that the to-be-scanned surface of the fed-in document can be completely cleaned. The cleaning curtain can adopt a single-layered structure made from rubber sheet, foam sheet or other plastics sheet with elasticity, adopt a dual-layered or multi-layered composite structure, or adopt a composite dual-layered structure constituted by a hard plastics sheet and a soft material layer. The hard plastics sheet supports the cleaning curtain structure, and the soft material layer contacts and cleans the surface of the fed-in document. The cleaning curtain can be formed by an elastic plastic cleaning sheet whose one end is rubber and the other end is a composite structure constituted by an elastic sheet and a hard fixing sheet. The cleaning curtain can be a rectangular sheet or a sheet of another shape convenient for cleaning (for example, the vertical cross-section shows that the lower end portion is a blade edge). The upper end portion of the cleaning curtain, being fixed on the inner wall of the housing of the scanning device, can be disposed vertically or tilt to an angle. If the cleaning curtain tilts to an angle, the tilting direction of the cleaning curtain preferably forms an obtuse angle with the fed-in document. Thus, the lower end portion of the cleaning curtain naturally bends towards the out-going direction of the fed-in document, and the linear contact between one edge of the lower end portion and the to-be-scanned surface of the fed-in document can effectively clean the attached substance off the to-be-scanned surface to protect the glass window of the scanning module from being affected by the attached substance and maintain the cleanness of the glass window.

The cleaning curtain can be fixed at any position in front of the glass window of the scanning module according to the structure of the scanning device as long as the to-be-scanned surface of the fed-in document can be cleaned. As the scanning module of the sheet-fed scanning device is normally disposed above the document supporter, the cleaning curtain is also fixed at the upper end of the inner wall of the housing for cleaning the to-be-scanned surface of the fed-in document. The cleaning curtain can be fixed by way of bonding or being integrally formed with the housing in one piece or other fixing methods. For example, when a composite cleaning curtain is adopted, the cleaning curtain is constituted by two different materials, wherein the upper end of the cleaning curtain is an elastic element such as a metal elastic sheet, and the lower end of the cleaning curtain is a soft cleaning sheet, so that the metal elastic sheet can be hot-melted on the housing or the metal elastic sheet can be embedded into the inner wall of the housing.

Before operating the cleaning curtain, the lower end portion of the cleaning curtain is located under the to-be-scanned surface of the fed-in document so that when the fed-in document is fed into the scanning device, a certain level of pressure occurs between the lower end of the cleaning curtain and the fed-in document, such that the scanning curtain is naturally bent and friction which occurs during the cleaning process is small Thus, the structure of the cleaning curtain is ideal for self-cleaning.

The sheet-fed scanning device with cleaning mechanism is simple in structure, and is effective in cleaning the fed-in document. The cleaning mechanism does not cost much but avoids the scanning quality being affected due to the large friction of the cleaning element. The cleaning mechanism is applicable to all kinds of sheet-fed scanning devices to ensure long-term cleanness of the to-be-scanned surface of the fed-in document as well as the cleanness of the glass window of the scanning module and the quality of the scanned image.

The invention will become apparent from the following detailed description of the preferred but non-limiting embodiments. The following description is made with reference to the accompanying drawings.

DETAILED DESCRIPTION OF THE INVENTION

Figure 1:
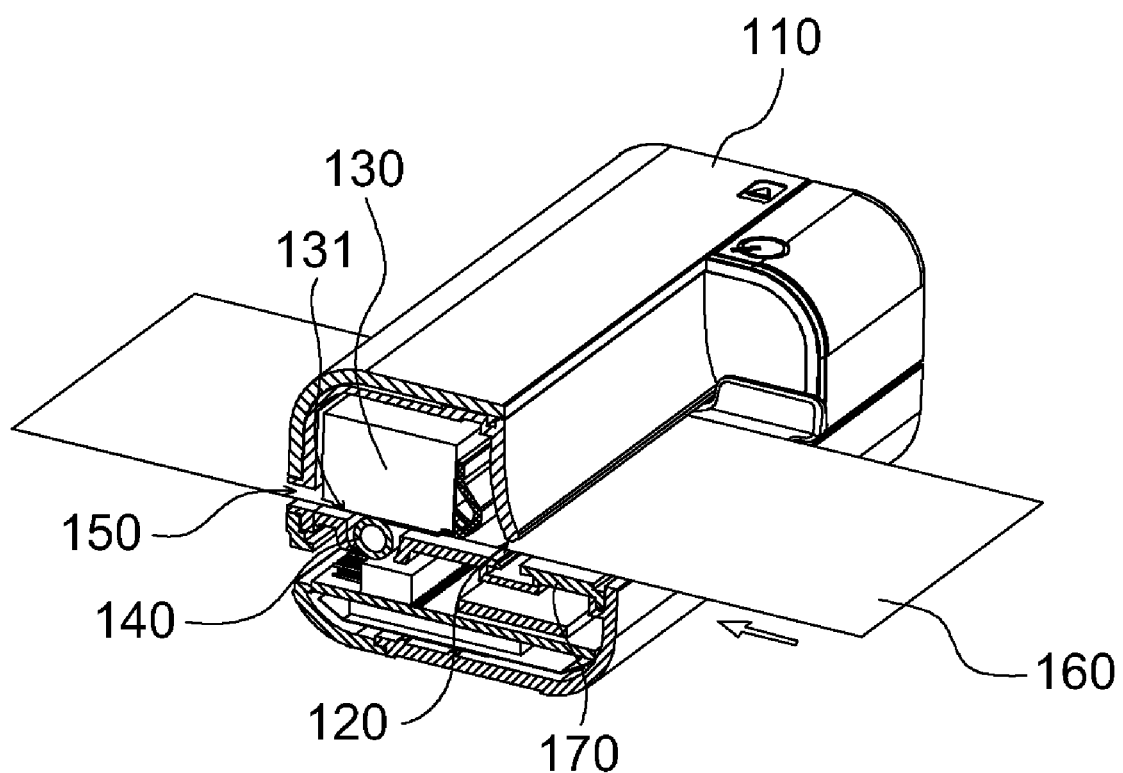
FIG. 1 shows a cross-sectional structure of a generally known sheet-fed scanning device.
Figure 2:
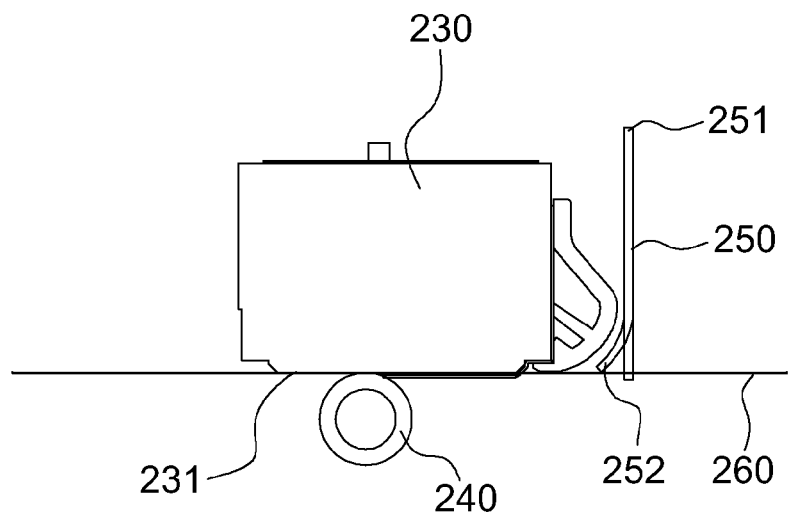
FIG. 2 shows the structural working principle of the invention.

The working principle of the sheet-fed scanning device with cleaning mechanism is illustrated in FIG. 2. A CIS scanning module 230 is still with respect to the body of the sheet-fed scanning device. The front end of the scanning module 230 used for scanning the fed-in document 260 is driven by a sheet-feeding roller 240 for enabling a glass window 231 to perform linear scanning on the upper end of the fed-in document 260 and to obtain a scanned image. The cleaning curtain 250 is disposed in a sheet-fed direction at the front end of the scanning module 230. When the lower end portion 252 of the cleaning curtain 250 is elastically in contact with the to-be-scanned surface of the fed-in document 260, the cleaning curtain 250 removes objects such as the dust attached on the fed-in document to assure that the to-be-scanned surface is clean for avoiding the attached substance being adhered onto the glass window and affecting the quality of the scanned image. The upper end portion 251 of the cleaning curtain 250 is fixed on the housing of the scanning device.

Figure 3:
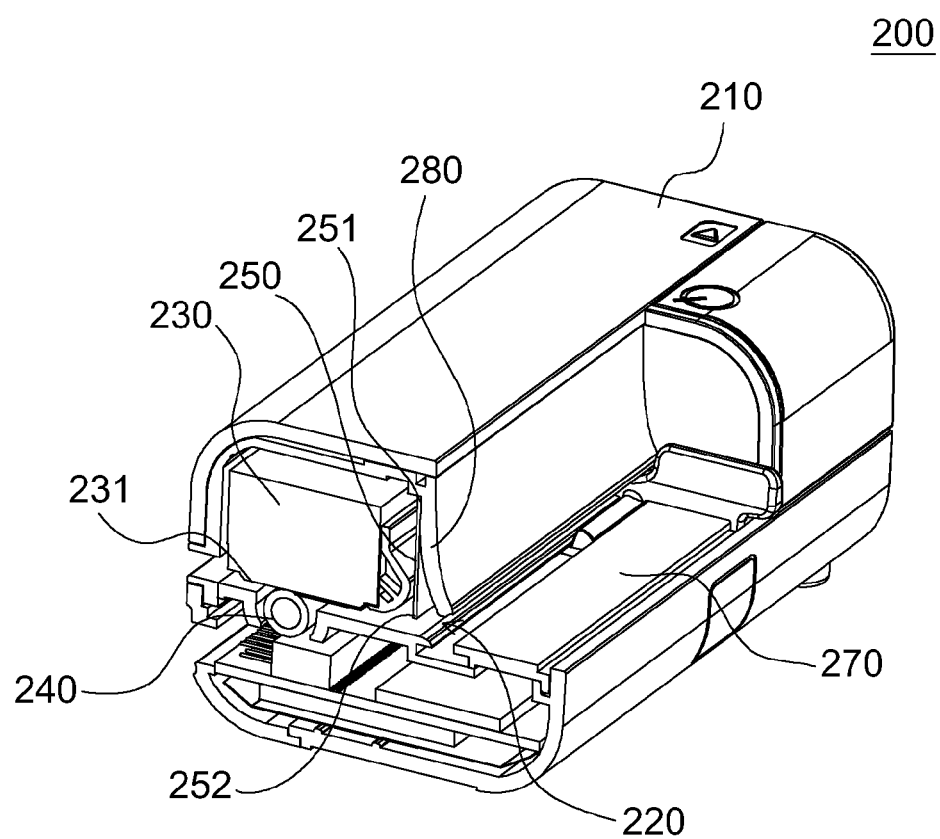
FIG. 3 shows a cross-sectional structure of a preferred embodiment of the invention.

FIG. 3 shows a cross-sectional structure of a preferred embodiment of the sheet-fed scanning device 200 with cleaning mechanism. The sheet-fed scanning device 200 is a small-sized portable scanner. A CIS scanning module 230 of the scanning device 200 is still with respect to the scanner body 210. A sheet-feeding roller 240 is disposed under the CIS scanning module 230 for controlling the feeding speed of the fed-in document. A scanner document fed-in entrance 220 is close to a glass window 231 of the scanning module 230. One end of the sheet-fed scanning device 200 is a document fed-in entrance 220 with a document supporter 270, and the other end of the sheet-fed scanning device 200 is a fed-in document exit. A cleaning curtain 250 made of a rectangular sheet is disposed vertically and fixed on the inner wall of the housing of the scanning device. The cleaning curtain 250 is made from an elastic rubber sheet, wherein the upper end portion 251 of the cleaning curtain 250 is adhered to the housing of the scanning device. The housing around the document fed-in entrance 220 has a blocking portion 280 which forms the document fed-in entrance. The cleaning curtain 250 stays close to the inner wall of the upper end of the blocking portion 280, and there is an adhesion fixing portion between the upper end portion 251 of the cleaning curtain 250 and the inner wall of the upper end of the blocking portion 280 for fixing the cleaning curtain 250 firmly. The cleaning curtain 250 is perpendicular to the upper end of the document supporter 270. The width of the cleaning curtain 250 is equivalent to the maximum span of scanning of the scanner glass window 231 so that the cleaning curtain 250 is able to clean the entire to-be-scanned surface of the fed-in document. The height of the cleaning curtain 250 is larger than the distance between the inner wall of the housing and the fed-in surface formed on the document supporter 270.

Figure 4:
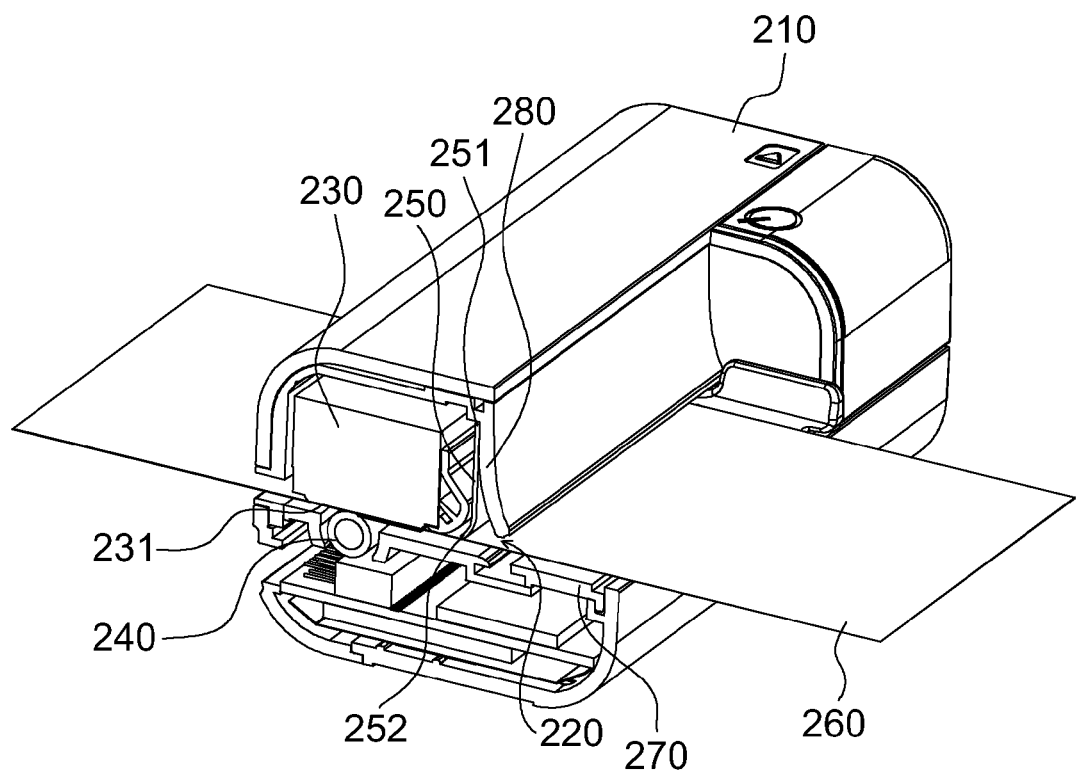
FIG. 4 shows a cross-sectional structure of the scanning device of FIG. 3 in use.

FIG. 4 shows a cross-sectional structure of a sheet-fed scanning device in use. A fed-in document 260 is fed into a document fed-in entrance 220 of the scanning device through a document supporter 270. A lower end surface of the scanning module 230 and a sheet-feeding roller 240 together retain and move the fed-in document 260 towards a fed-in document exit. The scanning module 230 obtains a scanned image data of the fed-in document through a glass window 231. An upper end portion 251 of a cleaning curtain 250 and an inner housing of the scanning device are adhered and fixed onto the top of the inner wall of a blocking portion 280 of the document fed-in entrance. The height of the cleaning curtain 250 is larger than the distance between the part of the housing, in which the cleaning curtain 250 is fixed, and the fed-in surface formed on the document supporter 270. A lower end portion 252 of the cleaning curtain 250 is bent in a sheet-fed direction due to friction. As the ridge at the right-hand side of the lower end portion 250 is in full contact with the to-be-scanned surface of the fed-in document 260, the substances attached on the to-be-scanned surface can be effectively cleaned. Thus, the to-be-scanned surface of any document passing through the cleaning curtain 250 is cleaned, and the substances attached on the fed-in document can hardly be adhered onto the glass window 231. The problems of scanning defects and image errors, which arise when there are substances, such as dust, being attached on the glass window 231, will not occur. To clean the cleaning curtain, the user only needs to open the housing at the front of the scanning device.

Figure 5:
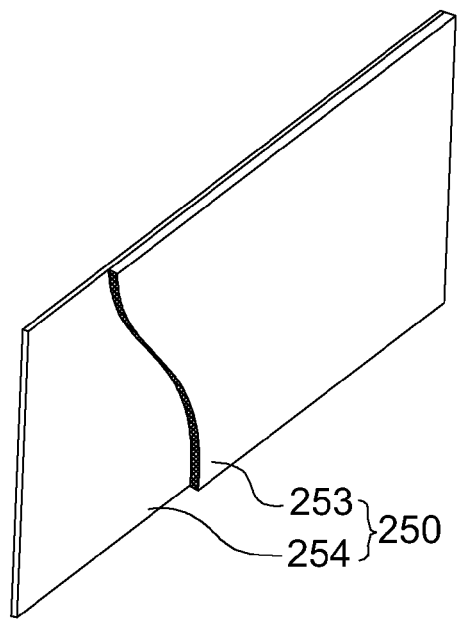
FIG. 5 shows a partial cross-sectional structure of an embodiment of a cleaning curtain the invention

As for the material of the sheet used in the cleaning curtain 250, the elastic rubber sheet can be replaced by a dual-layered flexible sheet. For example, the cleaning curtain can adopt the dual-layered flexible sheet illustrated in FIG. 5. The cleaning curtain 250 of FIG. 5 is made from a composite structure constituted by two materials. The first layer 254 is a tough polypropylene thin sheet with strong supporting strength. The second layer 253, being a piece of soft cleaning cotton or cleaning sheet made from foam material, is mainly used for cleaning. The first layer 254 and the second layer 253 are combined together to form the cleaning curtain 250. In FIG. 4, the cleaning curtain can be alternatively formed in the manner that the first layer 254 is disposed at the left and the second layer 253 is disposed at the right. During the cleaning process, after the lower end portion of the cleaning curtain 250 is bent to the left, the second layer 253 approximately forms a linear contact with the to-be-scanned surface so as to clean the attached substance off the to-be-scanned surface. Meanwhile, the first layer 254 provides the second layer 253 with sufficient support such that the second layer 253 has a certain level of elastic resistance to assure the cleaning effect and the overall stability of the cleaning curtain.

Figure 6:
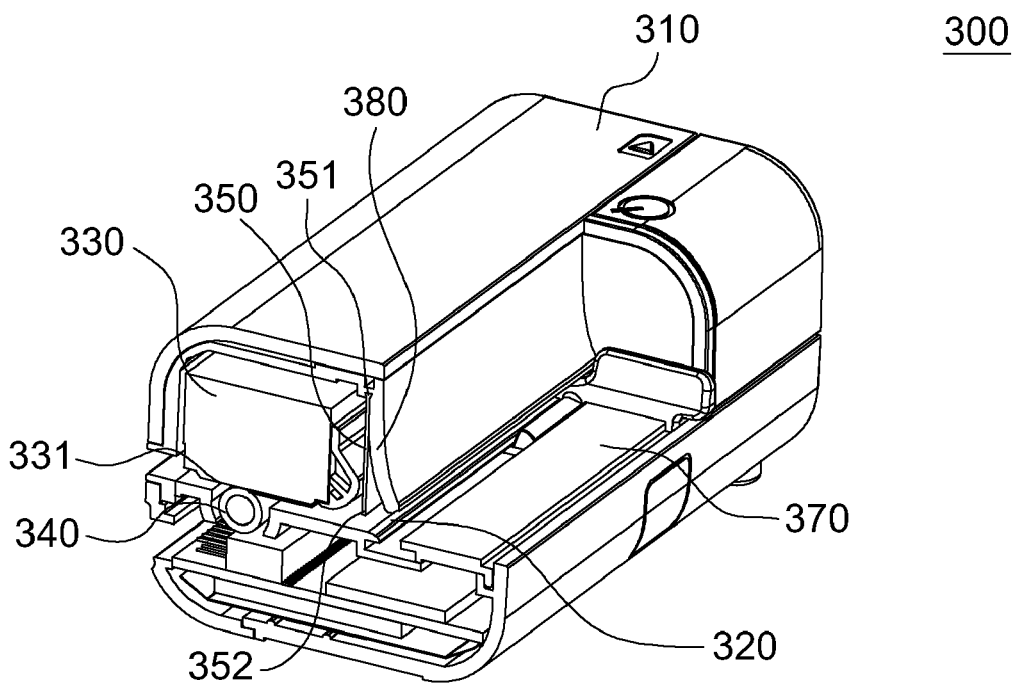
FIG. 6 shows a cross-sectional structure of another embodiment of the invention.

FIG. 6 shows a cross-sectional structure of another embodiment of the invention. The scanning device 300 is a small-sized portable scanner whose CIS scanning module 330 is still with respect to the scanner body 310. The right-hand side of the scanning device 300 is a document fed-in entrance 320 with a document supporter 370, and the left-hand side is a fed-in document exit. The CIS scanning module 330 is disposed above the left-hand side of the document supporter 370, and a glass window 331 downwardly faces a to-be-scanned surface of a fed-in document fed in through the document fed-in entrance 320. A cleaning curtain 350 is vertically disposed inside the blocking portion 380 which is disposed above the document fed-in entrance 320. The cleaning curtain 350 is a composite elastic sheet made from a foam material. An upper end portion 351 of the cleaning curtain 350 has a swallow-tailed protrusion, and the inner wall of the housing of the scanning device has a slot corresponding to the swallow-tailed protrusion. The swallow-tailed protrusion of the cleaning curtain 350 is embedded into the slot. A lower end portion 352 is slightly lower than the fed-in surface of the document supporter 370, so that the lower end portion 352 can be in contact with the fed-in document with suitable friction.

Figure 7:
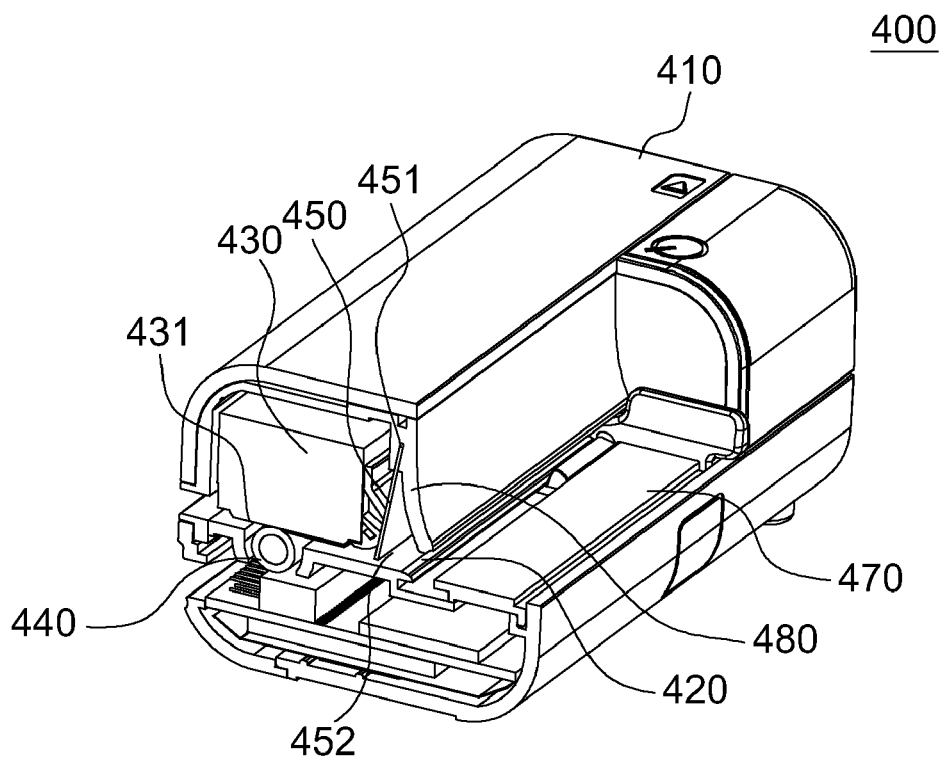
FIG. 7 shows a cross-sectional structure of yet another embodiment of the invention.

FIG. 7 shows a cross-sectional structure of yet another embodiment of the invention. The scanning device 400 is a small-sized portable scanner whose CIS scanning module 430 is still with respect to the scanner body 410. The right-hand side of the scanning device 400 has a document fed-in entrance 420 with a document supporter 470, and the left-hand side has a fed-in document exit. The CIS scanning module 430 is disposed above the left-hand side of the document supporter 470, and a glass window 431 downwardly faces a to-be-scanned surface of a fed-in document fed in through the document fed-in entrance 420. A cleaning curtain 450 tilting to an angle is disposed inside a blocking portion 480 which is disposed above the document fed-in entrance 420. The cleaning curtain 450 is a flexible sheet which forms an obtuse angle of approximately 160 degrees with an outgoing direction of the fed-in document. A lower end portion 452 of the cleaning curtain 450 is naturally bent by a force which occurs when the cleaning curtain 450 is in contact with the to-be-scanned surface of the fed-in document. An upper end portion 451 of the cleaning curtain 450 is embedded into a slot formed on the inner wall of the housing of the scanning device and is further adhered and fixed onto the housing.

Figure 8:
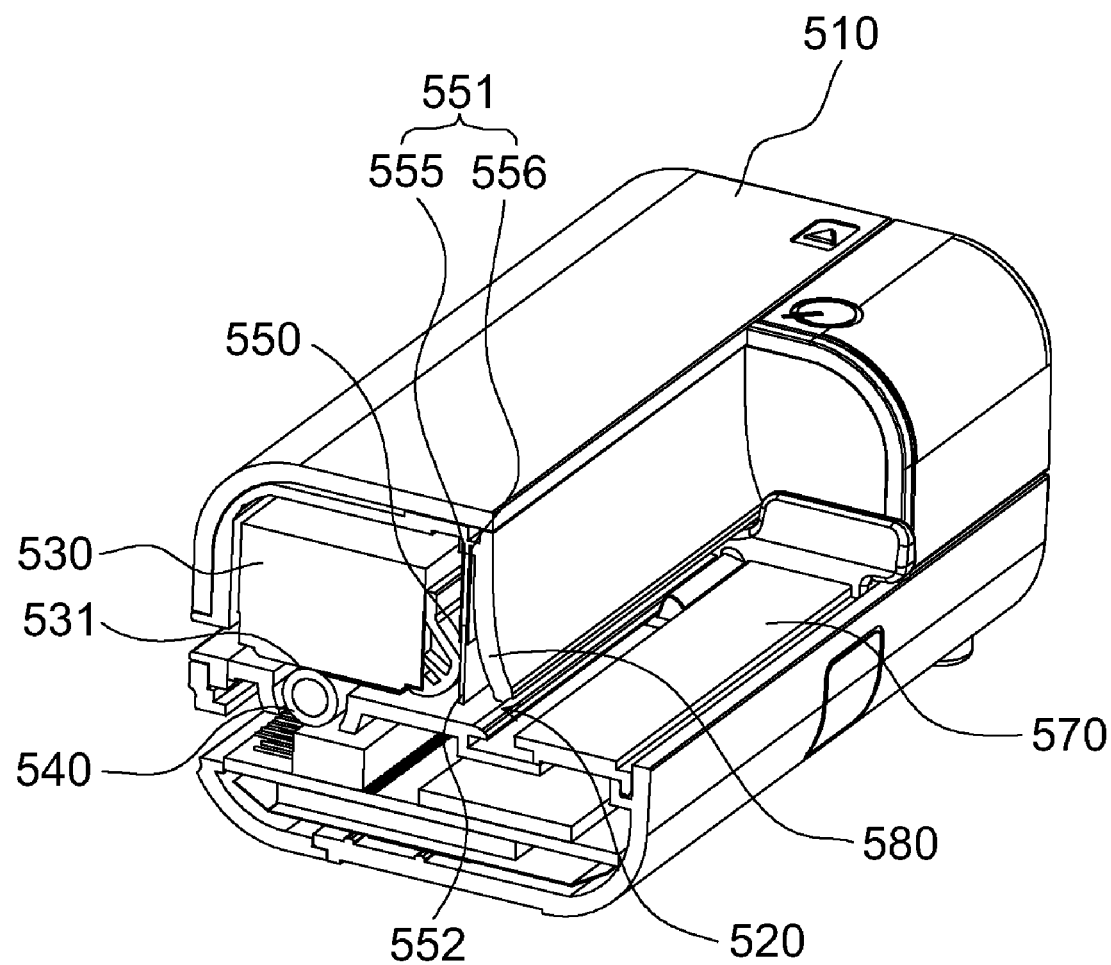
FIG. 8 shows a cross-sectional structure of further another embodiment of the invention.

FIG. 8 shows a cross-sectional structure of further another embodiment of the invention. The scanning device 500 is a small-sized portable scanner whose CIS scanning module 530 is still with respect to the scanner body 510. The right-hand side of the scanning device 500 has a document fed-in entrance 520 with a document supporter 570, and the left-hand side is a fed-in document exit. The CIS scanning module 530 is disposed above the left-hand side of the document supporter 570, and a glass window 531 downwardly faces a to-be-scanned surface of a fed-in document fed in from the document fed-in entrance 520. A cleaning curtain 550 is fixed on the inner wall of the scanning device to the right of the scanning module 530. The cleaning curtain 550 includes an upper end portion 551 and a lower end portion 552, wherein the upper end portion 551 is a connecting element constituted by a first elastic metal sheet 555 and a second elastic metal sheet 556, and the lower end portion 552 is a flexible sheet. A first elastic metal sheet 555 and a second elastic metal sheet 556 are hot-melted and fixed on an inner wall of the housing of a blocking portion 580 near the scanner document fed-in entrance. The first elastic metal sheet 555 and the second elastic metal sheet 556, which are disposed downwardly and vertically, retain the lower end portion 552, which is a polypropylene flexible sheet. When the polypropylene flexible sheet is in contact with the to-be-scanned surface of the fed-in document, the upper end portion 551 constituted by the first elastic metal sheet 555 and the second elastic metal sheet 556 is bent to the left due to the friction force and provides the polypropylene flexible sheet of the lower end portion 552 with suitable friction for cleaning.

The sheet-fed scanning device with cleaning mechanism is applicable to small-sized sheet-fed scanning device as well as large-sized sheet-fed scanning device. The scanning module does not have to be disposed above the fed-in document. For example, the scanning module can be disposed under the fed-in document, and the cleaning curtain can be disposed at the opposite side of the scanning module. The cleaning curtain can adopt many different types of flexible sheets or general-purpose composite cleaning sheets.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sheet-fed scanning device with cleaning mechanism, comprising:
    a housing;
    a scanning module for scanning a fed-in document; and
    a cleaning curtain whose one end is fixed on the sheet-fed scanning device, wherein the cleaning curtain is disposed in a sheet-fed direction at the front end of the scanning module, and the edge of other end of the cleaning curtain is elastically in contact with the fed-in document for cleaning a to-be-scanned surface of the fed-in document.

2. The sheet-fed scanning device with cleaning mechanism according to claim 1, wherein the cleaning curtain and the scanning module are located at the same side of the housing, the cleaning curtain is a flexible sheet, the upper end portion of the cleaning curtain is fixed on the inner wall of the housing, and the lower end portion is located under the fed-in document, so that when the lower end portion is in contact with the fed-in document, the lower end portion is bent and forms a linear contact with the fed-in document.

3. The sheet-fed scanning device with cleaning mechanism according to claim 2, wherein the cleaning curtain is perpendicular to the fed-in document or forms an obtuse angle with the out-going direction of the fed-in document.

4. The sheet-fed scanning device with cleaning mechanism according to claim 1, wherein the cleaning curtain is fixed at the inner side of the housing of the scanning device near the document feeding entrance, and the width of the cleaning curtain is equal to or larger than the width of the transparent window of the scanning module.

5. The sheet-fed scanning device with cleaning mechanism according to claim 1, wherein the cleaning curtain comprises a flexible plastics sheet made from rubber or foam, and the upper end portion of the cleaning curtain and the inner wall of the housing are integrally formed in one piece.

6. The sheet-fed scanning device with cleaning mechanism according to claim 1, wherein the cleaning curtain is a composite dual-layered structure constituted by a flexible sheet and a soft cleaning member.

7. The sheet-fed scanning device with cleaning mechanism according to claim 1, wherein the cleaning curtain comprises a hard or a flexible sheet, the hard or the flexible sheet is located at the lower end of the cleaning curtain, and the upper end of the hard or the flexible sheet has a connecting element elastically connecting the hard or the flexible sheet to the housing.

8. The sheet-fed scanning device with cleaning mechanism according to claim 1, further comprising a fed-in surface for supporting the fed-in document, and the height of the cleaning curtain is larger than the distance between the upper end portion and the fed-in surface, so that after the lower end portion of the cleaning curtain is bent, the lower end portion is elastically in contact with the fed-in document.

9. The sheet-fed scanning device with cleaning mechanism according to claim 1, wherein the cleaning curtain is fixed on the inner wall of the housing or at the scanner fixing component disposed at the front end of the scanning module.

10. The sheet-fed scanning device with cleaning mechanism according to claim 1, wherein the upper end portion of the cleaning curtain has a fixing element comprising an embedding portion or an engaging portion for attaching to the inner wall of the housing.

* * * * *